(12) United States Patent
Mahajan et al.

(10) Patent No.: US 10,634,594 B2
(45) Date of Patent: Apr. 28, 2020

(54) MEMBRANE TEST FOR MECHANICAL TESTING OF STRETCHABLE ELECTRONICS

(71) Applicant: Intel Corporation, Santa Clara, CA (US)

(72) Inventors: Ravindranth V. Mahajan, Chandler, AZ (US); Rajendra C. Dias, Phoenix, AZ (US); Pramod Malatkar, Chandler, AZ (US); Steven A. Klein, Chandler, AZ (US); Vijay Subramania, Gilbert, AZ (US); Aleksandar Aleksov, Chandler, AZ (US); Robert L. Sankman, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 849 days.

(21) Appl. No.: 15/075,086

(22) Filed: Mar. 18, 2016

(65) Prior Publication Data
US 2017/0268971 A1    Sep. 21, 2017

(51) Int. Cl.
*G01N 3/08* (2006.01)

(52) U.S. Cl.
CPC ..................... *G01N 3/08* (2013.01)

(58) Field of Classification Search
USPC .......................................................... 73/818
See application file for complete search history.

(56) References Cited

U.S. PATENT DOCUMENTS

| 3,781,141 | A | * | 12/1973 | Schall ................... F01L 25/063 |
| | | | | 417/395 |
| 5,673,586 | A | | 10/1997 | Mann |
| 6,050,138 | A | | 4/2000 | Lynch et al. |
| 6,467,357 | B1 | | 10/2002 | Pe |
| 7,409,848 | B2 | * | 8/2008 | Petrinic ................... G01N 3/12 |
| | | | | 73/12.08 |
| 9,591,758 | B2 | * | 3/2017 | Aleksov ............... H05K 1/0284 |
| 10,195,634 | B2 | * | 2/2019 | Selby .................. B05B 17/0646 |

FOREIGN PATENT DOCUMENTS

| EP | 1443317 | 4/2004 |
| WO | WO-2015064819 | 5/2015 |

OTHER PUBLICATIONS

International Search Results and Written Opinion for PCT Application No. PCT/US2017/015128 dated May 10, 2017, 17 pages.
International Preliminary Report on Patentablity for International Patent Application No. PCT/US2017/015128, dated Sep. 27, 2018, 14 pages.

* cited by examiner

*Primary Examiner* — Octavia Hollington
(74) *Attorney, Agent, or Firm* — Schwabe, Williamson & Wyatt, P.C.

(57) ABSTRACT

A membrane test for mechanical testing of wearable devices is described. A mechanical testing system includes an actuation mechanism including a clamp to hold a membrane including stretchable electronics over an opening in the actuation mechanism, wherein the actuation mechanism is to apply pressure to the membrane through the opening; and a testing logic to control the application and release of pressure on the membrane by the actuation mechanism.

23 Claims, 6 Drawing Sheets

| Inputs | | | | | | Outputs | |
|---|---|---|---|---|---|---|---|
| Sample Type | Humidity (%) | Temperature (deg C) | Salinity | Exx Strain (%) | Eyy Strain (%) | Cycles to failure | Failure Type | Failure Value |
| Sample A | 10 | 30 | Yes | 30 | 30 | 1000 | Delam | N/A |
| Sample B | 10 | 30 | No | 60 | 60 | 150 | Bulk Fracture | N/A |
| Sample C | 10 | 30 | No | 10 | 10 | >10,000 | Trace cracking | 6 MOhms |

FIG. 4

FIG. 5

MEMBRANE TEST FOR MECHANICAL TESTING OF STRETCHABLE ELECTRONICS

TECHNICAL FIELD

Embodiments described herein generally relate to the field of electronic devices and, more particularly, a membrane test for mechanical testing of stretchable electronics.

BACKGROUND

Stretchable electronics, in which electronic circuits are deposited on stretchable substrates or embedded in stretchable materials, have the potential to be utilized in many new types of devices, including wearable devices and other implementations.

The stretching of stretchable electronics will inevitably stress the electronic elements to some degree, and may be cause failure over time. As new uses for stretchable electronics are being developed, it is becoming increasing important to provide repeatable testing of the stretchable electronics under appropriate conditions in order to fully understand the mechanical capability and reliability risks for stretchable electronic devices.

However, testing of stretchable electronics is generally not standardized, and thus it is difficult to properly evaluate materials and devices that contain stretchable electronics.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are generally directed a membrane test for mechanical testing of stretchable electronics.

"Stretchable electronics" or "elastic electronics" means electronic circuits that are deposited on stretchable substrates or embedded into stretchable materials, wherein the stretchable materials. The electronic circuits may include stretchable electronic devices. Stretchable electronics may include, but are not limited to, circuits embedded in wearable devices.

"Wearable device", "wearable electronic device", or "wearable" refers in general to clothing and accessories that incorporate electronic devices. A wearable device may include stretchable electronics.

In some embodiments, an apparatus, system, or method provides for a membrane test for mechanical testing of stretchable electronics. In some embodiments, a testing process for stretchable electronics includes the application of pressure to a membrane containing stretchable electronics.

In some embodiments, a stretchable electronics membrane is clamped or attached to a plate or other surface with an opening through it. The opening is in an instrument (referred to herein as an actuation mechanism) that can apply pressure to the device through the opening. The actuation mechanism may include air pressure or other fluid based, mechanical pressure (such as a curved pusher), or other pressure instrument. In some embodiments, a deformation of the membrane sample is provided to better approximate an actual use condition (such as being attached to body or clothing) in comparison with a typical tensile test. An apparatus or system simulates the expansion of the wearable devices in a similar way as would occur on the human body, thus providing a more realistic estimate of the type of mechanical damage that may occur to the samples in use. In some embodiments, mechanical testing may include multiple application and release of pressure cycles to provide repeated forces on the device under test.

In some embodiments, an apparatus or system includes a bilateral actuation mechanism by which the pressure on the membrane may be reversed, thus allowing for a testing in which the membrane is expanded in an opposite direction. In some embodiments, the mechanical testing may include multiple cycles of: apply pressure—release—apply opposite pressure—release.

In some embodiments, the testing further includes the addition of one or more environment factors, such as temperature, humidity, and salinity (salt water testing to simulate sweat), to simulate conditions for the device under test in use, including use when in contact with or near to human skin. In some embodiments, the mechanical testing may include testing within a chamber, where, for example, temperature and other conditions may be adjusted to mimic use conditions and for accelerated temperature cycling testing. In some embodiments, the conditions being mimicked may include conditions for a patch that is on a human body, conditions for a bracelet or other wearable under daily temperature changes, and other such conditions.

In some embodiments, an apparatus or system includes electrical monitoring in-situ. In contrast to typical tensile testing of samples in lab scenarios, which may determine where bulk fracture occurs, electrical monitoring allows for detection of, for example, electrical opens in the traces of a device. In some embodiments, an apparatus or system is further operable to provide cyclic testing, which can detect types of damage to the device that are different than, for example, stretching a device sample to failure.

Figure 1A:
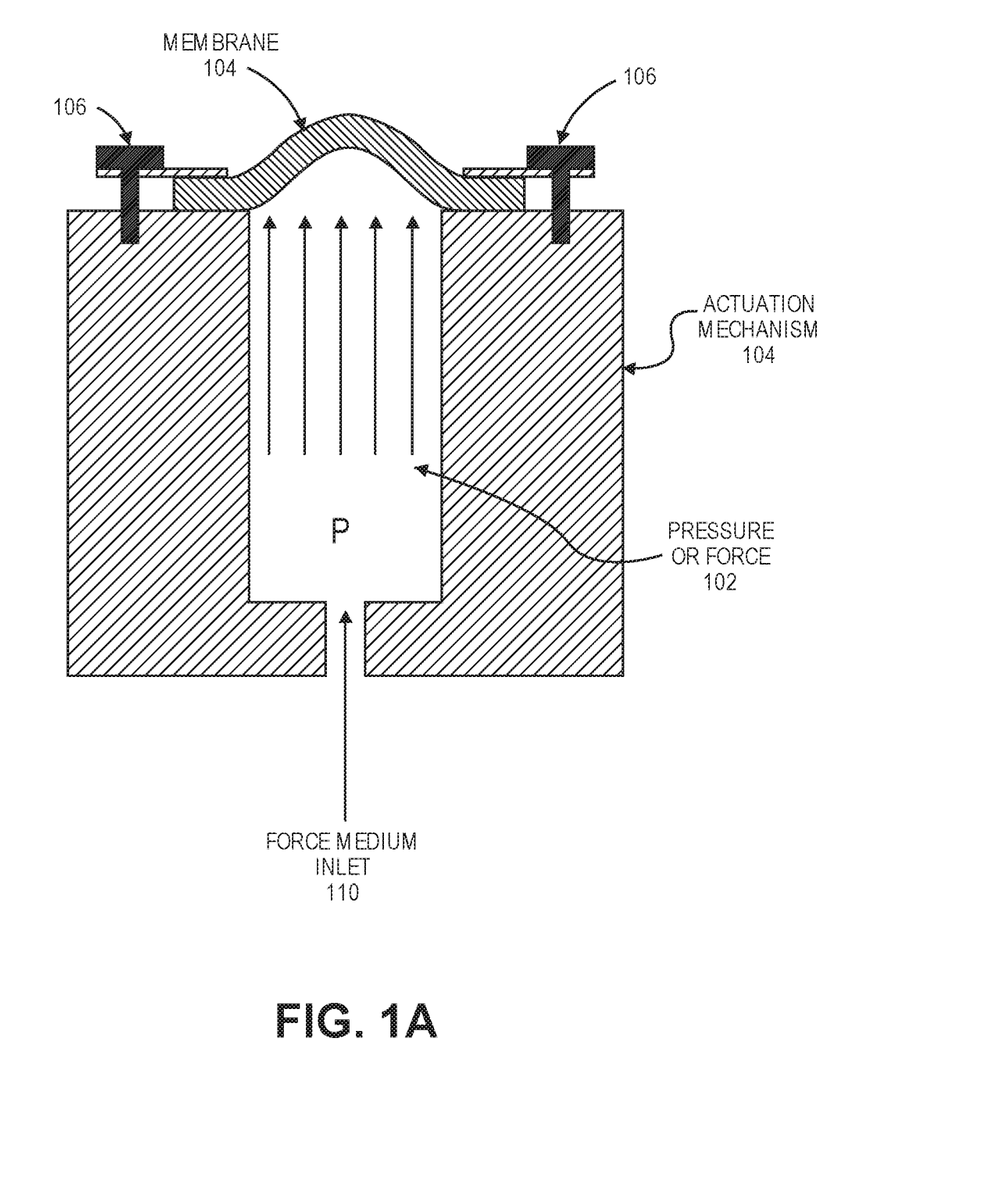
FIG. 1A is an illustration of a membrane test for mechanical testing of stretchable electronics.

FIG. 1A is an illustration of a membrane test for mechanical testing of stretchable electronics. As illustrated in FIG. 1A, a sample membrane 104 (also referred to as a device under test, or DUT) is clamped utilizing one or more clamps 106 to a top plate or portion of an actuation mechanism 104, wherein the membrane is coupled above an opening in the top plate or portion of the actuation mechanism. In some embodiments, the actuation mechanism is to provide fluid pressure, mechanical pressure, or other force on the membrane through the opening to provide a force on the membrane 104.

In FIG. 1A, "P" represents the air pressure or other force 102 that is uniformly distributed on the underside of the membrane sample. In some embodiments, the regions under the clamps 106 may be designed to simulate the product attach process (such as an armband, wristband, clothing, or other items). In some embodiments, the air pressure could be replaced with a different actuation mechanism to cause the sample to deform in a similar manner. Also illustrated is a force medium inlet, which in this implementation may be an inlet for air under pressure.

Other possible actuation mechanisms are mechanical (using a curved pusher), magnetic (using permanent magnets or electromagnets), bimetallic strip (could deform with temperature if temperature cycling is also desired), or shape memory alloys (could deform with temperature if temperature cycling is also desired). A schematic of a setup with air pressure actuation method is FIG. 2, other actuation methods would have slightly different schematics based on controlling their specific actuators.

Figure 1B:
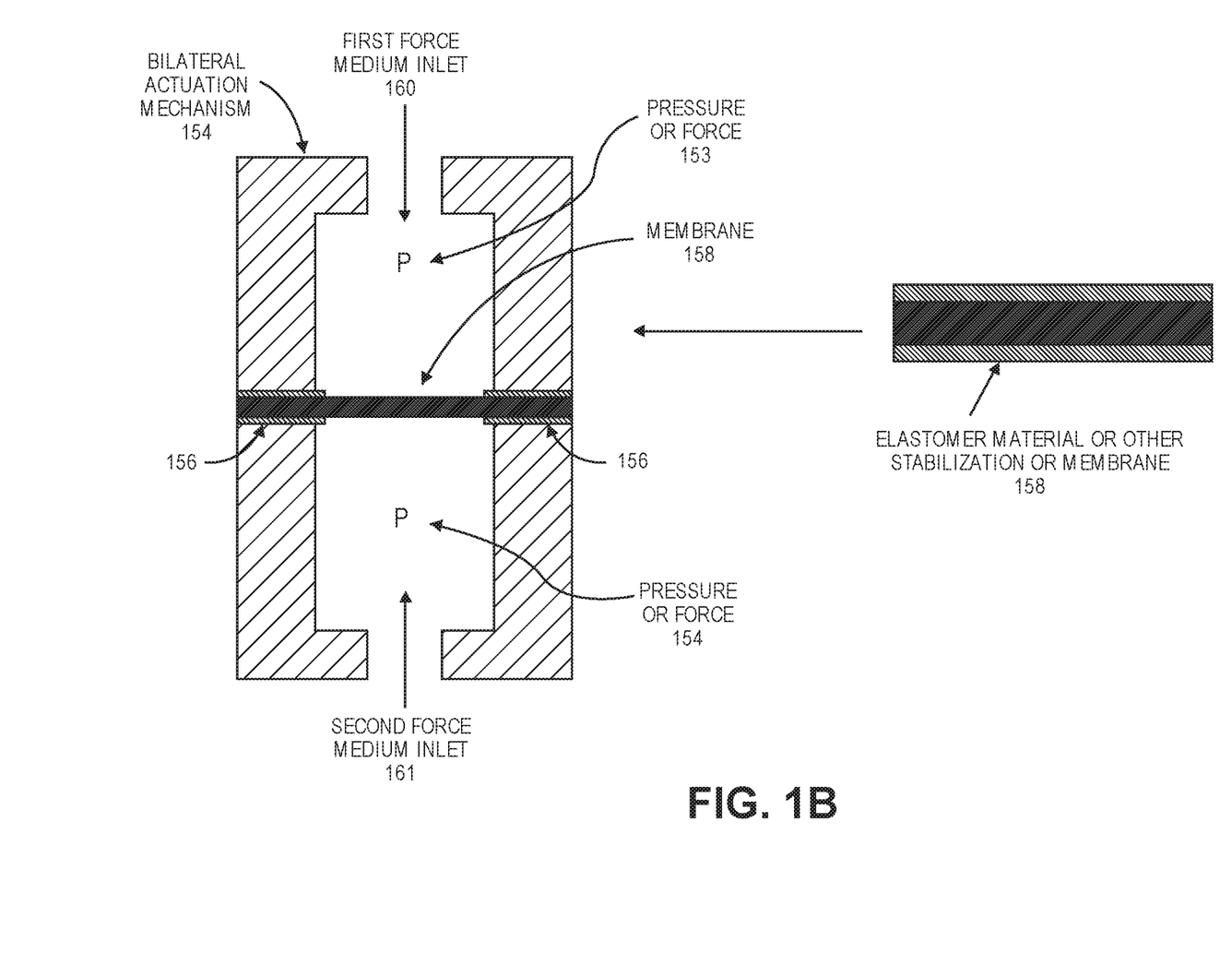
FIG. 1B is an illustration of a bilateral membrane test for mechanical testing of stretchable electronics.

FIG. 1B is an illustration of a bilateral membrane test for mechanical testing of stretchable electronics. As illustrated in FIG. 1B, a sample memory 158 is clamped utilizing one or more clamps 156 across an opening in a mid-portion of a bilateral actuation mechanism 154. In some embodiments, the bilateral actuation mechanism is to provide fluid pressure, mechanical pressure, or other force on the membrane in alternating directions through the opening to provide a bilateral force on the membrane 154.

In FIG. 1B, "P" represents the air pressure or other force 153 on a first side of the membrane, or the air pressure or other force 154 on a second side of the membrane, which is uniformly distributed on either side of the membrane sample. In some embodiments, the membrane may be attached by an elastomer material or stabilization for the membrane 158. In some embodiments, the air pressure could be replaced with a different actuation mechanism to cause the sample to deform in a similar manner. Also illustrated are a first force medium inlet 160 and a second force medium inlet 161, which in this implementation may be inlets for air under pressure.

Figure 2:
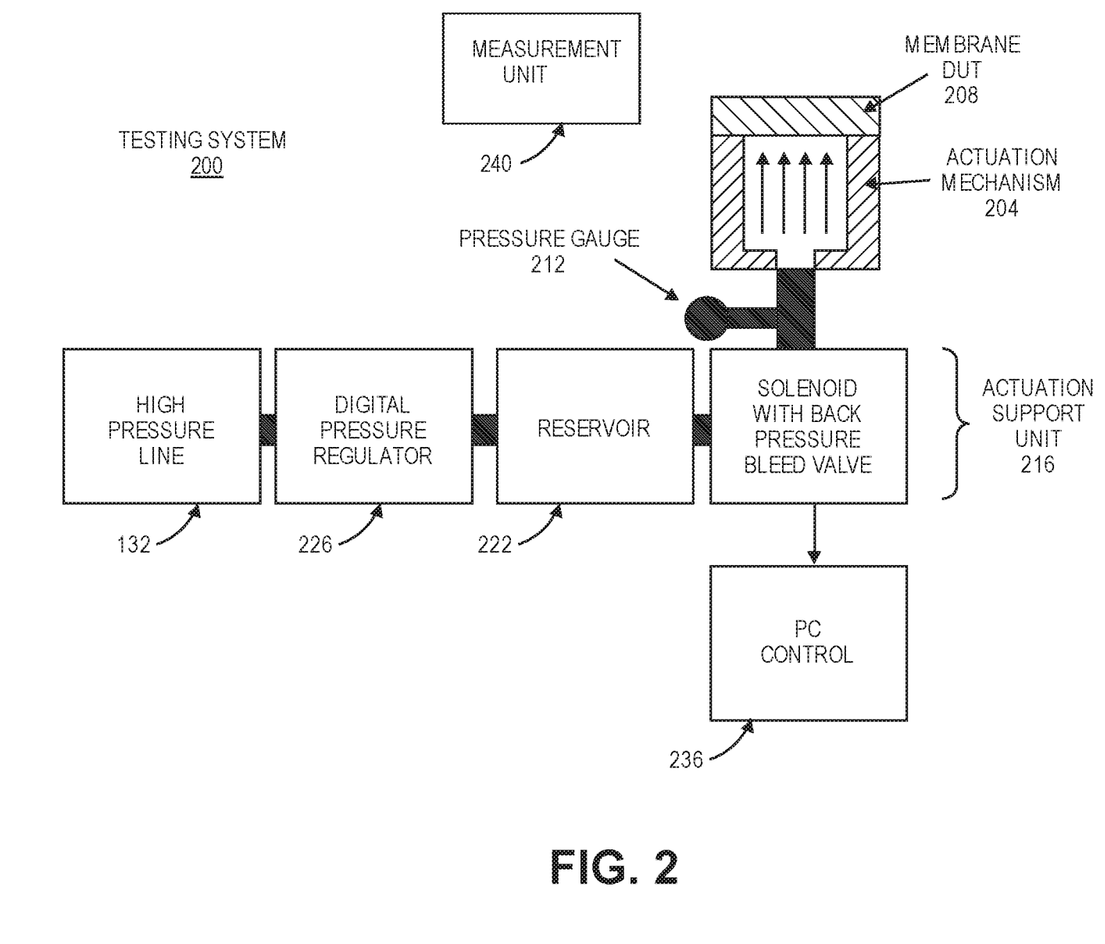
FIG. 2 is an illustration of a stretchable electronics testing system providing membrane testing according to an embodiment.

FIG. 2 is an illustration of a stretchable electronics testing system providing membrane testing according to an embodiment. In the high level diagram provided in FIG. 2, a testing system 200 includes an actuation mechanism 204 to which may be attached a stretchable electronics membrane as a device under test (DUT) 208 over and opening, wherein the force generated by the actuation mechanism through the opening deflects the sample membrane to apply mechanical force to the stretchable electronics of the device under test 208. In some embodiments, the actuation mechanism may be a bilateral actuation mechanism.

In some embodiments, the testing system may further include a pressure gauge (such as a digital pressure gauge) 212 to measure the air pressure for the actuation mechanism 204. In some embodiments, the system 200 an actuation support mechanism 216 for the particular force to be applied, such as a solenoid with back pressure release valve to allow pressure into the actuation mechanism 204 and hold the pressure, and to allow release of pressure from the actuation mechanism 204, to thus apply and release pressure. In other implementation, the solenoid may be replaced with a different valve unit to enable the application and release of pressure for the actuation mechanism 204.

In some embodiments, the system 200 includes a reservoir 222 to hold air under pressure for the actuation mechanism 204. In some embodiments, the system further includes a pressure regulator, such as a digital pressure regulator 226, to regulate the level of air pressure for the reservoir 222. In some embodiments, the pressure regulator 226 is coupled with a line, such as house pressure line 232 to provide pressurized air for the actuation mechanism 204, where the pressure line 232 may be coupled with a compressor, which is not shown in FIG. 2.

In some embodiments, the system 200 includes a control unit, such as personal computer (PC) control 236, to control the testing process for the device under test 208, including the application and release of pressure cycles for the actuation mechanism 204 via control of the solenoid 216.

In some embodiments, the system 200 may further include a measurement unit 240 to measure a displacement of the membrane 208 caused by the applied pressure. The measurement unit may use one or more technologies to measure the displacement, such as an automatic determination based on light reflection time utilizing one or more displacement photodetectors; or digital image correlation wherein a camera and lens system tracks the displacement or strain of the sample in a non-contact manner. The digital image correlation may be utilized to provide real time measurement of mechanical force applied to the device under test.

Figure 3:
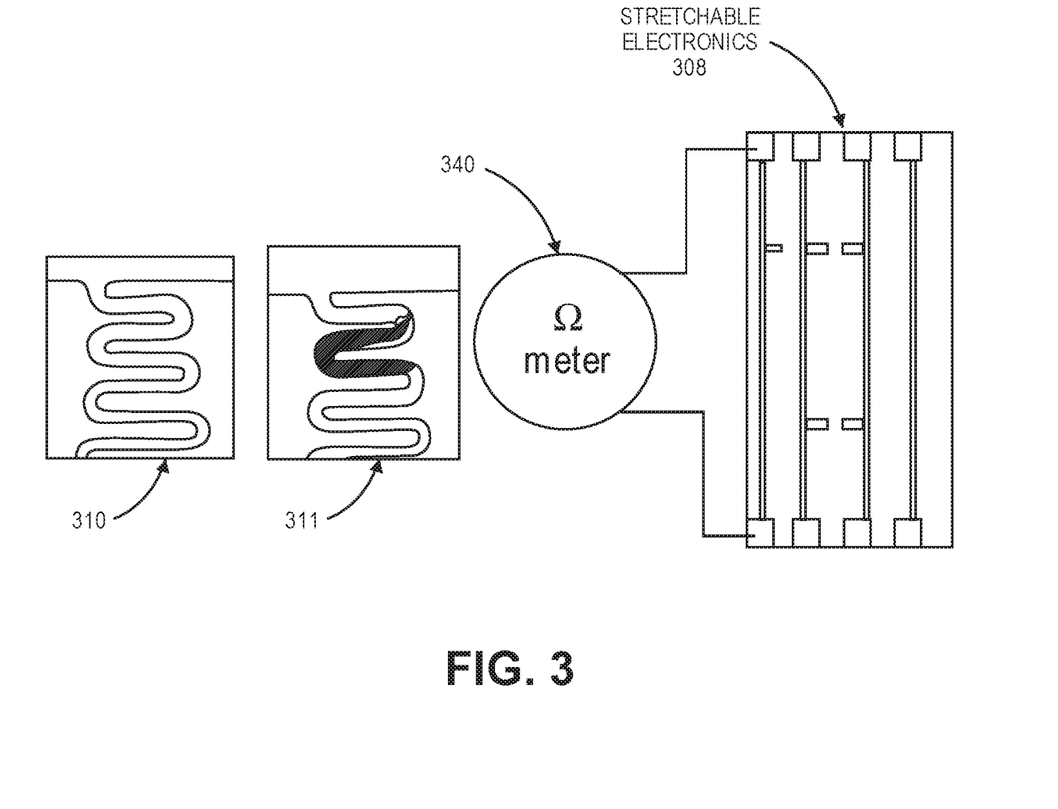
FIG. 3 is an illustration of electrical testing provided in conjunction with mechanical testing of stretchable electronics according to an embodiment.

FIG. 3 is an illustration of electrical testing provided in conjunction with mechanical testing of stretchable electronics according to an embodiment. In some embodiments, a test operation for stretchable electronics 308, such as the membrane device under test 104 illustrated in FIG. 1A, the membrane device under test 158 illustrated in FIG. 1B, or the device under test 208 illustrated in FIG. 2, includes, but is not limited to, testing of one or more electrical values for the stretchable electronics 308 as the electronics are subjected to mechanical force, such as mechanical force induced on the membrane in FIGS. 1A, 1B, and 2. The electrical testing is provided to determine onset of failure of the stretchable electronics as a result of the mechanical force applied by the testing. The electrical testing may include, but is not limited to, measurement of resistance change. In some embodiments, the electrical testing may be combined with the mechanical testing illustrated in FIGS. 1A, 1B, and 2.

In a particular implementation, the mechanical testing of stretchable electronics may affect a trace section 310 such that a least a portion of the trace section lifts away as shown in the trace section 311. Because of this affect, the electrical resistance of the trace may change, wherein the change may result in an infinite resistance at an extreme but also result in simply a higher than normal resistance in other cases. Further, in addition to any permanent change in resistance, a temporary or sporadic change may occur, such as only while a force is applied to the stretchable electronics 330. In some embodiments, the testing may include application of an ohmmeter 340 to measure resistance, where such measurement may be made constantly or at certain sample points to allow detection of temporary or sporadic changes in resistance.

Figure 4:
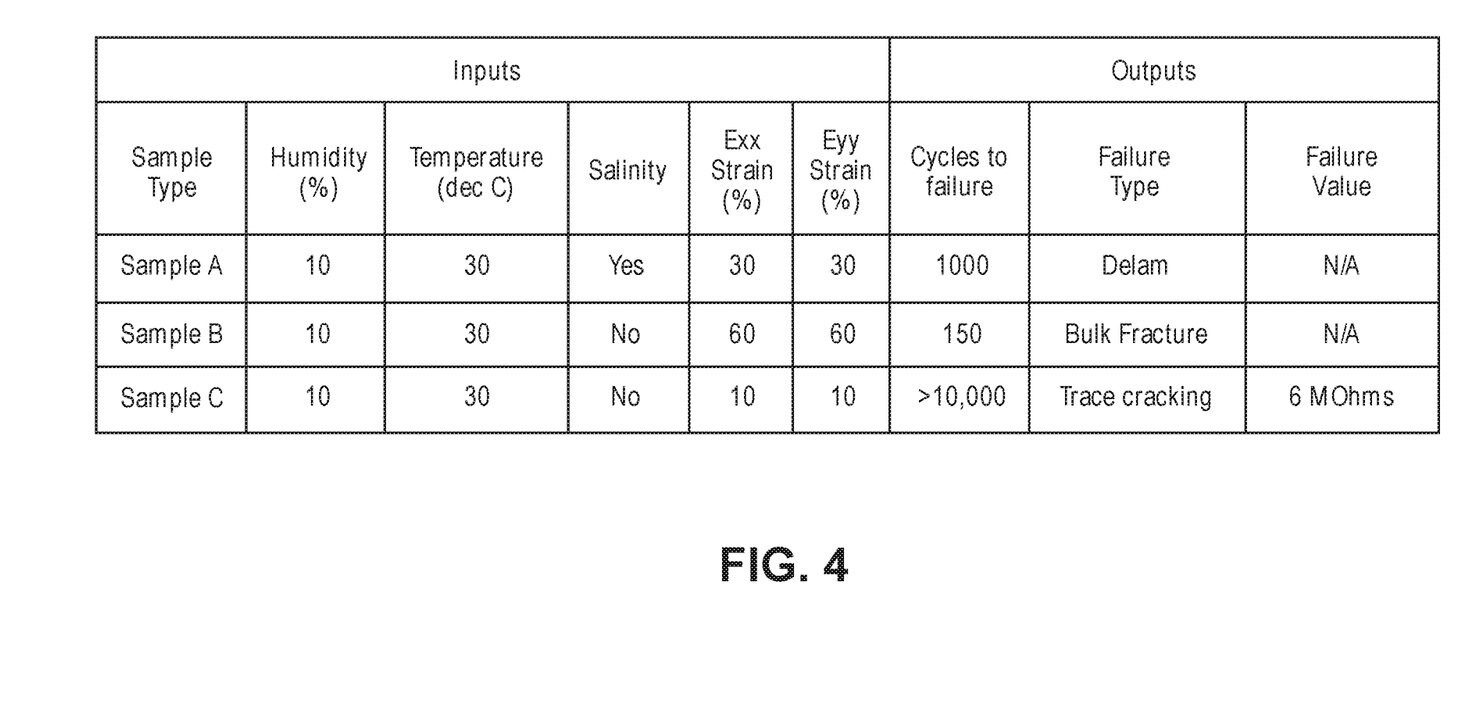
FIG. 4 is an illustration of test settings for a mechanical test of stretchable electronics according to an embodiment.

FIG. 4 is an illustration of test settings for a mechanical test of stretchable electronics according to an embodiment. In some embodiments, the testing may include testing using the system illustrated in FIG. 1A or 1B or as illustrated in FIG. 2. While particular examples of testing for three samples are illustrated in FIG. 4, embodiments are not limited to the illustrated inputs and outputs, or to particular settings for each test.

In some embodiments, testing inputs for each of a plurality of samples may include, but are not limited to, a humidity level (as a percentage); a temperature level (as degrees Celsius); salinity (such as whether a certain amount of salt is or is not added); strain in a first direction (such as in terms of a percentage of a length in a first direction, $E_{XX}$ strain) and strain in a second direction (such as in terms of a percentage of a length in a second direction, $E_{YY}$ strain). Strain may also be measured directly using a strain gauge.

Other examples include ultraviolet testing to determine effect on cyclic testing, or damage resulting as a result from extended time at a set strain value (with humidity and temperature as variables as well).

In some embodiments, testing outputs for each of a plurality of samples may include a number of cycles to failure (such as a certain number of application and release of pressure cycles for a particular set of test input settings); a particular failure type (such as, for example, delamination of the stretchable electronics occurring within a certain number of cycles; bulk fracture of stretchable electronics occurring within a certain number of cycles; or trace cracking within any number of cycles); and a failure value (such as a certain electrical resistance value that is indicative of a trace cracking condition).

In some embodiments, the detection of a failure condition may include, but is not limited to, the following:

(1) Trace (metal) cracking: Trace cracking may be determined with an electrical resistance test, as resistance is expected to change as traces are damaged. In some embodiments, trace cracking may also include more complicated electrical testing, such as parametric testing and functional testing of stretchable electronics.

(2) Delamination: In some embodiments, for optically transparent materials testing for delamination may include can use optical imaging or photoelastic testing processes. In some embodiments, for non-transparent materials, delamination may detected using, for example, an acoustic sensor to identify areas of delamination (3) Bulk fracture: In some embodiments, bulk fracture testing may utilize electrical testing, such as described stated above.

Figure 5:
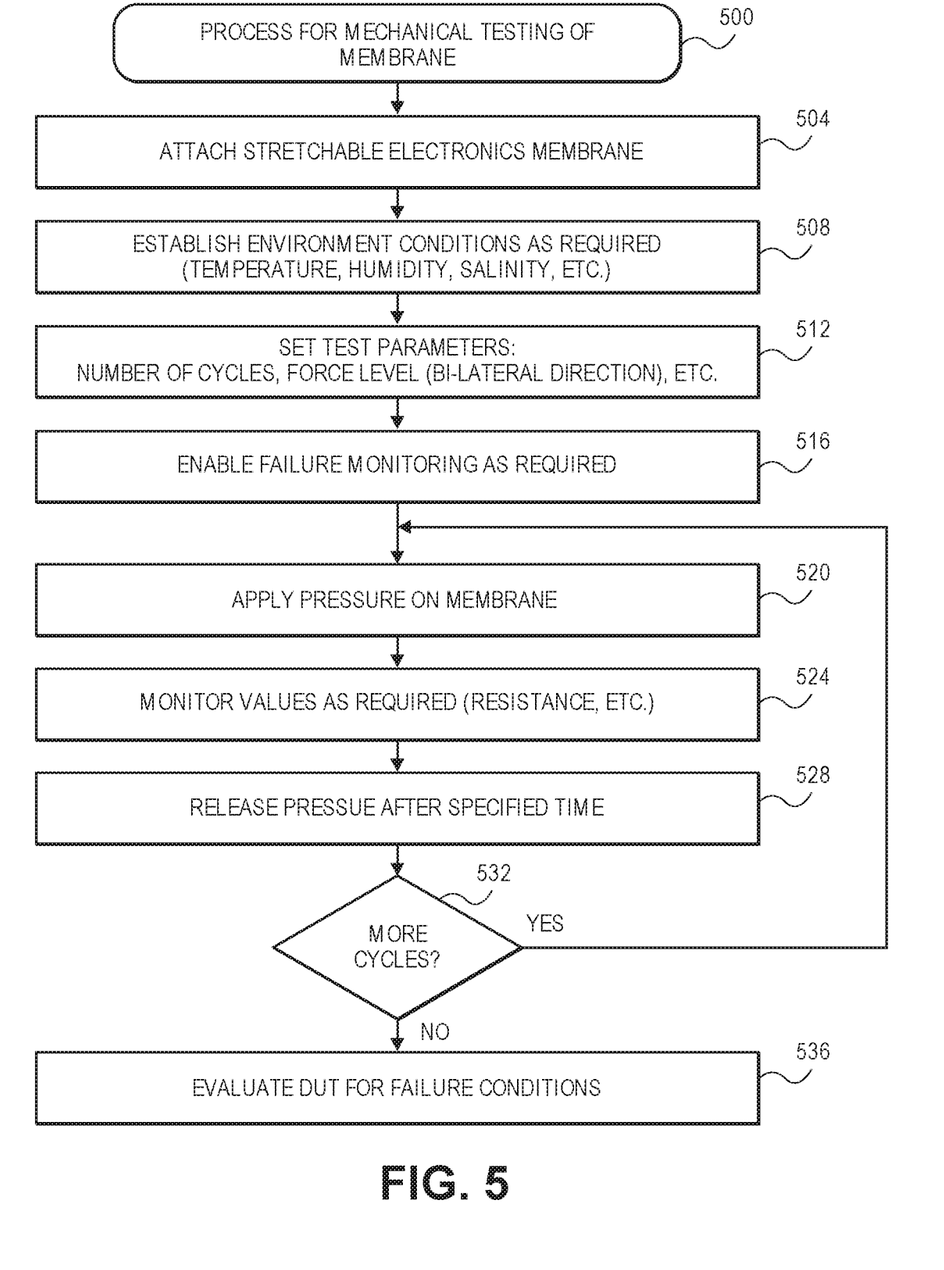
FIG. 5 is a flowchart to illustrate membrane based mechanical testing of stretchable electronics according to an embodiment.

FIG. 5 is a flowchart to illustrate membrane based mechanical testing of stretchable electronics according to an embodiment. In some embodiments, a process 500 for membrane based mechanical testing of stretchable electronics includes:

504: Attach stretchable electronics membrane to the actuation mechanism, which may include a bilateral actuation mechanism.

508: Establish environmental conditions as required for the mechanical testing, which includes, but is not limited to, establishing required conditions for temperature, humidity, and salinity, such as illustrated in FIG. 4.

512: Set test parameters, where such test parameters may include, but are not limited to, number of application and release of pressure cycles for the membrane by the actuation mechanism, and mechanical force level.

516: Enable failure monitoring as required for testing, including, but not limited to, electrical testing providing monitoring of electrical conditions of the stretchable electronics during testing (such as monitoring a resistance utilizing an ohmmeter or measure any other electrical value of the stretchable electronics); strain gauge monitoring; or digital image correlation.

520: Commence a first cycle by exerting a certain pressure on the membrane under test.

524: Monitor values for the stretchable electronics as required, such as illustrated in FIG. 3.

528: Complete an pressure-release cycle by releasing the pressure on the membrane after a certain time period;

532: Determine whether there are additional cycles to be performed in the particular test. If so, the process returns to applying pressure to the membrane to perform another cycle.

536: If not, the testing cycles are complete, and the process may continue with evaluating the stretchable electronics device under test to determine whether there is any failure of the device, such as by delamination, trace crack, or bulk fracture of the stretchable electronics.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, a mechanical testing system includes an actuation mechanism including a clamp to hold a membrane including stretchable electronics over an opening in the actuation mechanism, wherein the actuation mechanism is to apply pressure to the membrane through the opening; and a testing logic to control the application and release of pressure on the membrane by the actuation mechanism.

In some embodiments, the actuation mechanism is a bilateral actuation mechanism to apply pressure in a first direction and an opposite second direction on the membrane.

In some embodiments, the pressure through the opening is a fluid pressure on the membrane.

In some embodiments, the pressure through the opening is a mechanical pressure on the membrane.

In some embodiments, the system further includes a monitoring unit to monitor for a failure condition in the stretchable electronics device. In some embodiments, the monitoring unit is to detect an electrical value of the stretchable electronics device. In some embodiments, the electrical value is an electrical resistance value.

In some embodiments, the system further includes a measurement unit to measure a displacement of the membrane.

In some embodiments, the control unit includes a computer with control software.

In some embodiments, the system further includes a chamber to provide control of environmental conditions for the stretchable electronics.

In some embodiments, a method includes receiving test parameters for mechanical testing of a membrane including stretchable electronics, the membrane being coupled with an actuation mechanism to apply pressure through an opening in the actuation mechanism, the test parameters including a specified level of mechanical force to be applied to the membrane; performing one or more application and release of pressure cycles by the actuation mechanism based at least part on the test parameters; and monitoring for one or more failure conditions for the stretchable electronics device.

In some embodiments, the pressure is an application of air pressure.

In some embodiments, the pressure is an application of mechanical pressure.

In some embodiments, the mechanical forces include one or more of stress, strain, or displacement.

In some embodiments, the test parameters further include a specified number of application and release of pressure cycles for testing of the stretchable electronics.

In some embodiments, monitoring for one or more failure conditions includes monitoring one or more electrical values of the stretchable electronics device.

In some embodiments, the one or more electrical values of the stretchable electronics device include an electrical resistance of the stretchable electronics device.

In some embodiments, the method further includes applying one or more environmental conditions for the mechanical testing of the stretchable electronics.

In some embodiments, the one or more environmental conditions include one or more of temperature, humidity, and salinity.

In some embodiments, the one or more failure conditions include one or more of: trace cracking of the stretchable electronics device; delamination of the stretchable electronics device; or bulk fracture of the stretchable electronics device.

In some embodiments, a non-transitory computer-readable storage medium having stored thereon data representing sequences of instructions that, when executed by a processor, cause the processor to perform operations including receiving test parameters for mechanical testing of a membrane including stretchable electronics, the membrane being coupled with an actuation mechanism to apply pressure through an opening in the actuation mechanism, the test parameters including a specified level of mechanical force to be applied to the membrane; performing one or more application and release of pressure cycles by the actuation mechanism based at least part on the test parameters; and monitoring for one or more failure conditions for the stretchable electronics device.

In some embodiments, an apparatus includes means for receiving test parameters for mechanical testing of a membrane including stretchable electronics, the membrane being coupled with an actuation mechanism to apply pressure through an opening in the actuation mechanism, the test parameters including a specified level of mechanical force to be applied to the membrane; means for performing one or more application and release of pressure cycles by the actuation mechanism based at least part on the test parameters; and means for monitoring for one or more failure conditions for the stretchable electronics device.

What is claimed is:

1. A mechanical testing system comprising:
   an actuation mechanism including a clamp that extends into the actuation mechanism to hold a membrane including stretchable electronics over an opening in the actuation mechanism, wherein the actuation mechanism is to apply pressure to the membrane through the opening; and
   a control unit to control the application and release of pressure on the membrane by the actuation mechanism.

2. The system of claim 1, wherein the actuation mechanism is a bilateral actuation mechanism to apply pressure in a first direction and an opposite second direction on the membrane.

3. The system of claim 1, wherein the pressure through the opening is a fluid pressure on the membrane.

4. The system of claim 1, wherein the pressure through the opening is a mechanical pressure on the membrane.

5. The system of claim 1, further comprising a monitoring unit to monitor for a failure condition in the stretchable electronics.

6. The system of claim 5, wherein the monitoring unit is to detect an electrical value of the stretchable electronics.

7. The system of claim 6, wherein the electrical value is an electrical resistance value.

8. The system of claim 1, further comprising a measurement unit to measure a displacement of the membrane.

9. The system of claim 1, wherein the control unit includes a computer with control software.

10. The system of claim 1, further comprising a chamber to provide control of environmental conditions for the stretchable electronics.

11. A method comprising:
receiving test parameters for mechanical testing of a membrane including stretchable electronics, the membrane being coupled to an actuation mechanism by a clamp that extends into the actuation mechanism, the actuation mechanism applying pressure through an opening in the actuation mechanism, the test parameters including a specified level of mechanical force to be applied to the membrane;
performing one or more application and release of pressure cycles by the actuation mechanism based at least part on the test parameters; and
monitoring for one or more failure conditions for the stretchable electronics.

12. The method of claim 11, wherein the pressure is an application of air pressure.

13. The method of claim 11, wherein the pressure is an application of mechanical pressure.

14. The method of claim 11, wherein the mechanical forces include one or more of stress, strain, or displacement.

15. The method of claim 11, wherein the test parameters further include a specified number of application and release of pressure cycles for testing of the stretchable electronics.

16. The method of claim 11, wherein monitoring for one or more failure conditions includes monitoring one or more electrical values of the stretchable electronics.

17. The method of claim 16, wherein the one or more electrical values of the stretchable electronics includes an electrical resistance of the stretchable electronics.

18. The method of claim 11, further comprising applying one or more environmental conditions for the mechanical testing of the stretchable electronics.

19. The method of claim 18, wherein the one or more environmental conditions include one or more of temperature, humidity, and salinity.

20. The method of claim 11, wherein the one or more failure conditions include one or more of:
trace cracking of the stretchable electronics;
delamination of the stretchable electronics; or
bulk fracture of the stretchable electronics.

21. A non-transitory computer-readable storage medium having stored thereon data representing sequences of instructions that, when executed by a processor, cause the processor to perform operations comprising:
receiving test parameters for mechanical testing of a membrane including stretchable electronics, the membrane being coupled to an actuation mechanism by a clamp that extends into the actuation mechanism, the actuation mechanism applying pressure through an opening in the actuation mechanism, the test parameters including a specified level of mechanical force to be applied to the membrane;
performing one or more application and release of pressure cycles by the actuation mechanism based at least part on the test parameters; and monitoring for one or more failure conditions for the stretchable electronics.

22. The medium of claim 21, wherein monitoring for one or more failure conditions includes monitoring one or more electrical values of the stretchable electronics.

23. The medium of claim 22, wherein the one or more electrical values of the stretchable electronics includes an electrical resistance of the stretchable electronics.

* * * * *